Figures 1, 2:
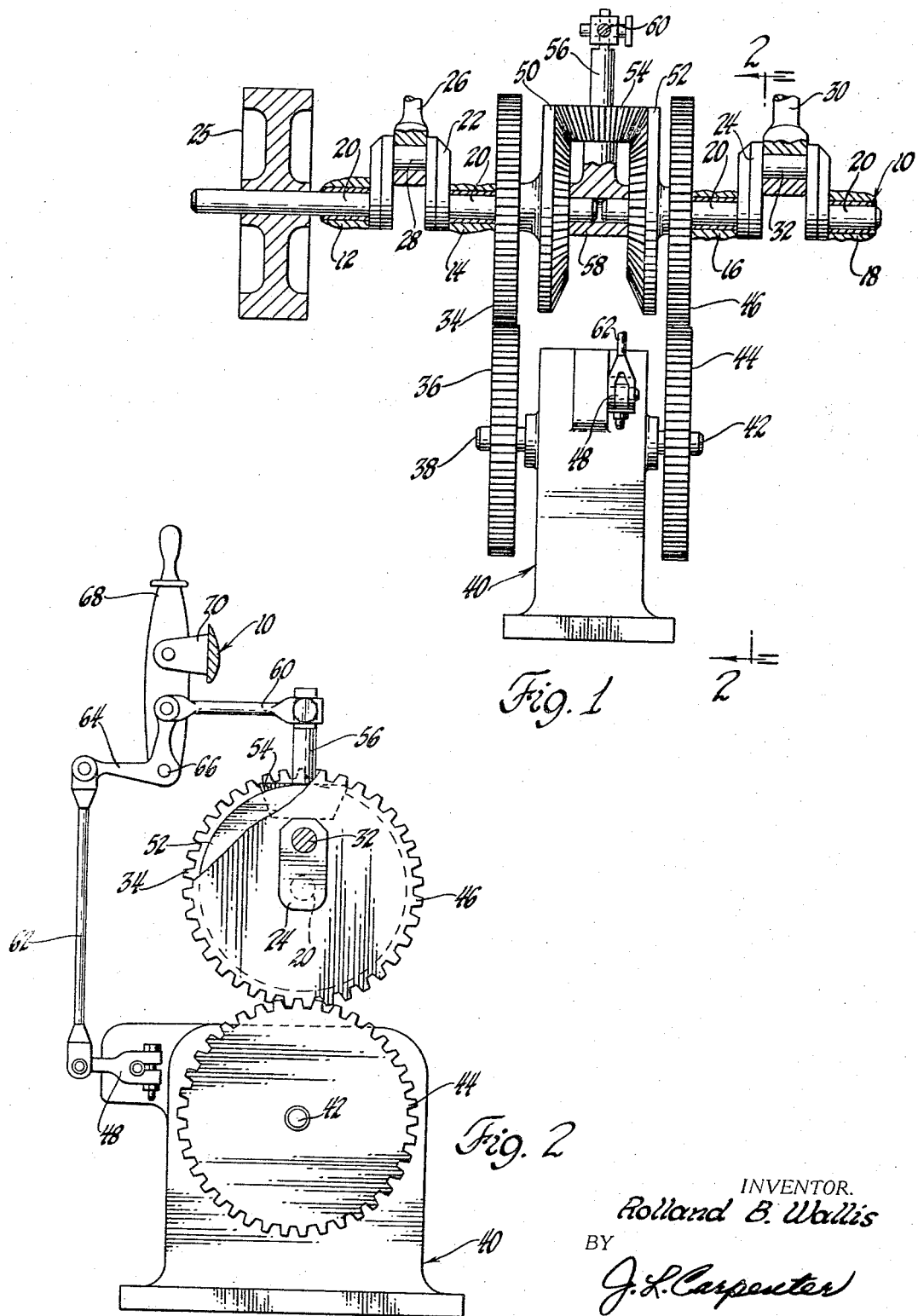

April 25, 1967 R. B. WALLIS 3,315,465

PHASE RELATION CONTROL

Filed July 9, 1965

INVENTOR.
Rolland B. Wallis
BY
J. L. Carpenter
ATTORNEY 3,315,465
       PHASE RELATION CONTROL
Rolland B. Wallis, La Grange Park, Ill., assignor to General Motors Corporation, Detroit, Mich., a corporation of Delaware
         Filed July 9, 1965, Ser. No. 470,674
              11 Claims. (Cl. 60—24)

This invention relates to phase relation control between dual rotatable members and more particularly to an arrangement whereby a multi-ratio transmission is drivingly connected between the dual crankshafts of an engine both to transmit power between the crankshafts and to provide for changing the phase angle between them.

Engines in which such dual crankshaft means are utilized include hot gas engines of the general type shown in U.S. Patent No. 2,465,139, Van Weenen, et al., which includes a power, or motor, piston and a displacer, or expeller, piston which reciprocate on a common axis. It is known in such engines to provide means for changing the phase angle between the two crankshaft portions driving the pistons in order to vary the power output of the engine. An example of such phase changing means is shown in the above-mentioned patent. Simple planetary and differential devices have also been used for this purpose.

While a number of such mechanical phase changing devices of relatively simple construction have been proposed, their operation has required an input by the operator, either manually or through the use of suitable booster servo devices, of sufficient torque to overcome the reaction forces acting between the two crankshafts.

In the present invention an arrangement is proposed which differs from the previously known constructions and avoids many of the problems associated therewith. This arrangement comprises the use of a variable ratio transmission between the two crankshaft portions. The transmission is, of course, a part of the power train through which the displacer piston crankshaft is driven by the power piston crankshaft. The transmission includes means for changing the speed ratio of one crankshaft with respect to the other by suitable values both above and below unity and thus is also the means by which the phase angle between the crankshafts may be changed as desired.

Selection of the proper transmission ratios in order to obtain the desired phase angle may, of course, be accomplished by an operator controlling directly the transmission selector lever. The invention contemplates, however, the use of suitable linkage or other means of control by which the desired phase angle may be selected by an operator. This selection will move the transmission ratio selector, causing a speed differential between the crankshafts so that the phase angle is changed in the desired direction and, when the selected phase angle is reached, the transmission selector lever will automatically be returned to the unity position through a suitable feedback mechanism acting in response to the phase angle between the crankshafts.

The proposed arrangement thus constitutes simple means for controlling the phase angle between a pair of rotating crankshafts in a manner which removes all reaction forces from the mechanical linkage or other operator actuated control means.

Other objects and advantages of the invention will be apparent from the following specification and drawings which illustrate schematically one embodiment of a crankshaft phase relation control mecahnism employing the ideas of the subject invention and in which:

FIGURE 1 is a fragmentary cross-sectional view of a dual crankshaft engine employing a crankshaft phase relation control according to the invention and having portions of the control linkage removed for clarity; and FIGURE 2 is a cross-sectional view of the mechanism of FIGURE 1 taken generally along the line 2—2 and including the linkage portions deleted in the first figure.

Referring now to the drawings, numeral 10 generally indicates a hot gas engine which may be of the general type illustrated in U.S. Patent 2,465,139, Van Weenen et al., which includes a motor, or power, piston and an expeller, or displacer, piston operating in the same or in adjoining cylinders. The engine includes four main journal bearing portions 12, 14, 16 and 18, in which the main journals 20 of a power crankshaft 22 and a displacer crankshaft 24 are carried longitudinally spaced for rotation around a common axis. Power crankshaft 22 carries a flywheel 25 on one end and is adapted to be driven by the engine power piston (not shown) through a connecting rod 26 which is connected to the throw 28 of the crankshaft. Displacer crankshaft 24 is driven by crankshaft 22 in a manner to be subsequently described and is adapted to drive the engine displacer piston (not shown) through a connecting rod 30 which is connected to the throw 32 of crankshaft 24.

At the other end from the flywheel, crankshaft 22 carries a spur gear 34 which drivingly engages another spur gear 36 carried on the input shaft 38 of a transmission 40. The transmission includes an output shaft 42 which rotates in a direction opposite input shaft 38 and carries a spur gear 44 in driving engagement with a spur gear 46 carried on the inner end of the displacer crankshaft 24. As indicated in the drawing, the spur gears are all of the same size, so that when the speed ratio of transmission 40 is 1:1 the power crankshaft 22 and the displacer crankshaft 24 are rotated at the same speeds but in opposite directions.

The transmission 40 may be any of the known types of devices which provide infinitely variable speed ratios of the output and input shafts between fixed limits, both above and below unity. Both hydraulic and mechanical transmissions of this type are presently available and thus need not be described in detail. The transmission includes a ratio selector lever 48 by means of which the speed ratio between the output and input shafts, and accordingly between the displacer crankshaft and power crankshaft, may be adjusted.

At the inner ends of the two crankshafts is provided a feedback mechanism comprising a bevel gear 50 secured to crankshaft 22 and a bevel gear 52 secured to crankshaft 24, each of which engages a bevel planet gear 54. The planet gear is carried on an arm 56 of a planet carrier 58, supported by the ends of crankshafts 22 and 24. Carrier arm 56 is interconnected with the transmission ratio selector lever 48 by a suitable linkage including reach rods 60 and 62 and a bell crank 64. The bell crank is carried on a movable pivot pin 66 which is secured to the end of a phase angle control lever 68 pivotally carried on mounting means 70 secured to he engine 10.

In operation, the engine power piston (not shown) drives crankshaft 22 through connecting rod 26 which in turn drives crankshaft 24 through gears 34, 36, 44, 46 and transmission 40, thereby driving the engine displacer piston (not shown). Since the main drive gears are all of the same size, the power crankshaft and displacer crankshaft have the same rotational speeds whenever the transmission ratio is equal to unity. The directions of rotation of the two crankshafts are, however, opposite to one another so that planetary gear 54 is held stationary by the equal and opposite rotations of bevel gears 50 and 52. This is the condition illustrated in the figures.

Control of the phase angle between displacer and power crankshafts is obtained by the operator through movement of the control lever 68. Assume, for example, that FIGURE 2 represents a stabilized operating condition in which the displacer crankshaft 24 is moving clockwise. If, then, the operator should desire to advance the rotational position of the displacer crankshaft 24 with respect to the power crankshaft 22, he would pivot the control lever 68 counterclockwise, as viewed in FIGURE 2, to a position representing the advanced phase angle at which he desires the crankshafts to operate. The resulting rightward movement of the pivot pin 66 will rotate bell crank 64 in a counterclockwise direction, moving reach rod 62 downwardly and rotating transmission ratio selector lever counterclockwise. This will increase the transmission ratio above unity, causing the output shaft 42 to rotate faster than input shaft 38. Accordingly, displacer crankshaft 24 will temporarily rotate at a higher rotational speed than power crankshaft 22, causing the phase angle between them to be changed in an advancing direction.

The difference in rotational speed between the crankshafts will cause movement of planetary gear 54 rotating carrier arm 56 in the direction of the phase angle change, or clockwise as viewed in FIGURE 2. The angular motion of the carrier arm will be equal to one-half the change in the phase angle between the crankshafts. As the carrier arm moves, it, of course, rotates bell crank 64 and ratio selector lever 48 clockwise until the selector lever is returned to the unity speed ratio position. At this point no further change in the phase angle takes place and a stabilized condition is reached wherein the displacer crankshaft is now rotating at the same speed as the power crankshaft, but at the advanced phase angle with respect thereto which was selected by the operator's movement of control lever 68.

Further advancement of the phase angle up to the limit of the linkage capabilities may be obtained by further movement of control lever 68 in a counterclockwise direction and, of course, movement of the control lever in a clockwise direction will change the phase angle between the displacer and power crankshafts in a retarding direction in a manner similar to that previously described.

While the embodiment disclosed herein specifically relates to the use of transmission means having a range of infinite speed ratio variations, it would also be possible to accomplish the purposes set forth herein by means of a three-speed transmission connected with suitable gearing to provide for ratios between the crankshafts of unity as well as ratios slightly above and slightly below unity and having a suitable control linkage or other means for selecting the proper ratio. Such an arrangement would not be as versatile as that shown herein, since only a single rate of phase angle change would be provided for in either direction but, for many purposes, it is believed such an arrangement would provide a practical solution.

It would also be possible to have the transmission ratio selector controlled exclusively by the operator without the use of a feedback mechanism. In such a case, a suitable phase angle indicator would be required by reference to which the operator could properly control the transmission to obtain the desired operating condition.

The use of a variable ratio transmission between the power and displacement crankshafts provides a crankshaft phase relation control mechanism which is driven directly by the torque from the power crankshaft and therefore prevents the exterior control mechanism from being affected by torque reactions from the driving and driven parts. This makes for ease of control by an operator without the necessity for requiring power servo devices for actuating the phase changing mechanism.

Additional modifications within the scope of the ideas presented herein will be apparent to those skilled in the art and the invention is accordingly to be limited only by the language of the appended claims.

I claim:
1. In combination with a pair of crankshafts adapted to be driven by the same power source, means to control the phase angle between said crankshafts comprising variable ratio transmission means drivingly connected between said crankshafts and including means providing a ratio of unity as well as predetermined ratios above and below unity to relate the rotational speeds of said crankshafts, and ratio selection means adapted to carry out the selection of said ratios so as to selectively relate said crankshaft speeds at any desired one of said ratios whereby the phase relation of said crankshafts with one another may be regulated in a desired manner.

2. The combination of claim 1 wherein said ratio selection means are substantially unaffected by driving torque delivered to said transmission means.

3. In combination with a pair of crankshafts adapted to be driven by the same power source, means to control the phase angle between said crankshafts comprising, transmission means drivingly connected between said crankshafts and including means for relating the rotational speeds of said crankshafts at a ratio of unity as well as at predetermined ratios above and below unity and means for operating said transmission means to selectively relate said crankshaft speeds at any desired one of said ratios to regulate the phase relation of said crankshafts with one another in a desired manner, said combination further including feedback means responsive to the phase angle between said crankshafts to regulate said transmission operating means so as to attain and hold a predetermined phase angle between said crankshafts.

4. The combination of claim 3 and further including manual selector means operatively connected with said feedback means to control the regulating action thereof and permit the selection of a desired crankshaft phase relation by the operator.

5. The combination of claim 4 wherein the crankshaft speed relating means of said transmission means are infinitely variable over the range of speed ratios provided.

6. In a hot gas engine having a power crankshaft and a displacer crankshaft driven by the power crankshaft, a variable ratio transmission connected between said crankshafts and including means providing predetermined ratios above and below unity as well as at unity to relate the rotational speeds of said crankshafts and ratio selection means connected with said transmission selective adjustment of which determines operation of said transmission at a desired one of said predetermined crankshaft ratios whereby the angular phase relation of said crankshafts with respect to one another may be regulated in a desired manner.

7. In a hot gas engine having a power crankshaft and a displacer crankshaft driven by the power crankshaft, a transmission connected between said crankshafts and adapted to relate the rotational speeds of said crankshafts at an infinite number of speed ratios between a pair of predetermined limits, one above and one below unity, a ratio selector lever on said transmission and operatively connected therewith to permit selection of any desired one of said crankshaft ratios, planetary gear means connected with each of said crankshafts and adapted to indicate the relative phase angle therebetween, mechanical linkage connecting said planetary gear means with said ratio selector lever to actuate said lever in response to changes in the phase angle between said crankshafts and a manual control lever connected with said mechanical linkage to actuate said ratio selector lever independently of said planetary gear means whereby actuation of said manual control lever to adjust said ratio selector lever to obtain a crankshaft speed ratio other than unity results in a change in the phase angle between said crankshafts in the proper direction and of sufficient magnitude for said planetary gear means to return said ratio selector lever to the unity position, thereby stabilizing crankshaft operation at equal rotational speeds but at a new phase angle.

8. In combination with a first rotatable member and a second rotatable member adapted to be driven by the first rotatable member, means to drivingly connect said first and second rotatable members and to control the phase angle between them comprising multiple ratio transmission means drivingly connecting said first and second rotatable members to drive said second member at a plurality of speed ratios with respect to said first member, means for selectively operating said transmission at a desired one of said speed ratios to regulate the phase relation of said members with one another in a desired manner and feedback means responsive to the phase angle between said members to regulate said transmission operating means so as to attain and hold a predetermined phase angle between said members.

9. The combination of claim 8 and further including manual selector means operatively connected with said feedback means to control the regulating action thereof and permit the selection of a desired crankshaft phase relation by the operator.

10. The combination of claim 9 wherein said plurality of speed ratios includes a ratio of unity as well as ratios above and below unity.

11. The combination of claim 9 wherein said transmission is capable of driving said second member at an infinite number of speed ratios with respect to said first member including all possible ratios lying between a predetermined ratio above unity and a predetermined ratio below unity.

References Cited by the Examiner
UNITED STATES PATENTS

| | | | |
|---|---|---|---|
| 2,465,139 | 3/1949 | Van Weenen et al. | 60—24 |
| 2,508,315 | 5/1950 | Van Weenen et al. | 60—24 |
| 2,583,311 | 1/1952 | Van Heeckeren | 60—24 |

EDGAR W. GEOGHEGAN, *Primary Examiner.*